(12) United States Patent
Hill

(10) Patent No.: US 9,715,777 B2
(45) Date of Patent: Jul. 25, 2017

(54) RFID PET DOOR

(75) Inventor: Nicholas Patrick Roland Hill, Cambridge (GB)

(73) Assignee: Cambridge Resonant Technologies Ltd., Cambridge (GB)

( * ) Notice: Subject to any disclaimer, the term of this patent is extended or adjusted under 35 U.S.C. 154(b) by 450 days.

(21) Appl. No.: 12/812,649

(22) PCT Filed: Jan. 14, 2009

(86) PCT No.: PCT/GB2009/050026
§ 371 (c)(1),
(2), (4) Date: Aug. 25, 2010

(87) PCT Pub. No.: WO2009/090426
PCT Pub. Date: Jul. 23, 2009

(65) Prior Publication Data
US 2010/0328030 A1    Dec. 30, 2010

Related U.S. Application Data

(60) Provisional application No. 61/023,013, filed on Jan. 23, 2008.

(30) Foreign Application Priority Data

Jan. 17, 2008 (GB) .................................. 0800819.5

(51) Int. Cl.
*G08B 23/00* (2006.01)
*G07C 9/00* (2006.01)
(Continued)

(52) U.S. Cl.
CPC ............ *G07C 9/00817* (2013.01); *E06B 7/32* (2013.01); *G06K 7/0008* (2013.01); *G07C 2009/00849* (2013.01)

(58) Field of Classification Search
CPC .................................................. G07C 9/00309
(Continued)

(56) References Cited

U.S. PATENT DOCUMENTS 4,497,133 A    2/1985  Blenkinsop
5,442,340 A *  8/1995  Dykema ...................... 340/5.25
(Continued)

FOREIGN PATENT DOCUMENTS

DE    4124143         1/1993
EP    1589656 A1     10/2005
(Continued)

OTHER PUBLICATIONS

International Search Report from WO2009/090426 dated Jul. 9, 2009.
(Continued)

*Primary Examiner* — Quan-Zhen Wang
*Assistant Examiner* — Israel Daramola
(74) *Attorney, Agent, or Firm* — Wolf, Greenfield & Sacks, P.C.

(57) ABSTRACT

An RFID reader for use in a pet door to control access for a pet bearing an RFID tag or implant. The RFID reader incorporates and is operable in two modes, a learn mode and a normal mode. In learn mode, the reader stores the ID code of an RFID transponder in the vicinity of the reader and also derives additional reader information corresponding to the RFID transponder. In normal mode, the reader compares the ID codes stored in memory to the RFID signal returned from an RFID transponder in the vicinity of said the reader. The RFID reader behavior is at least in part determined by the additional reader information corresponding to said ID codes stored in memory. We also describe a confidence threshold for acceptance of an ID code in learn mode and
(Continued)

normal mode. The confidence threshold in normal mode may be less than in learn mode.

18 Claims, 10 Drawing Sheets

(51) Int. Cl.
  *E06B 7/32* (2006.01)
  *G06K 7/00* (2006.01)
(58) Field of Classification Search
  USPC ....... 340/3.63, 5.2, 5.61, 10.1, 572.1, 572.4, 340/572.8, 573.3; 348/143; 49/70; 119/501, 51.02; 160/98; 235/451
  See application file for complete search history.

(56) References Cited

U.S. PATENT DOCUMENTS

| | | | |
|---|---|---|---|
| 5,952,922 A * | 9/1999 | Shober | 340/572.4 |
| 5,952,935 A | 9/1999 | Mejia | |
| 5,992,096 A | 11/1999 | De La Cerda et al. | |
| 6,044,795 A | 4/2000 | Matsuura | |
| 6,181,255 B1 | 1/2001 | Crimmins et al. | |
| 6,297,739 B1 | 10/2001 | Small | |
| 6,650,226 B1 | 11/2003 | Wuidart | |
| 6,944,990 B2 | 9/2005 | Noyes | |
| 7,075,412 B1 * | 7/2006 | Reynolds et al. | 340/10.2 |
| 7,798,103 B2 * | 9/2010 | Bosserdet et al. | 119/501 |
| 7,832,646 B1 * | 11/2010 | Leason | 235/492 |
| 7,834,762 B2 * | 11/2010 | Danvir et al. | 340/572.1 |
| 7,920,046 B1 * | 4/2011 | Aiouaz et al. | 340/3.63 |
| 7,932,809 B2 * | 4/2011 | Nair et al. | 340/5.2 |
| 2002/0011217 A1 | 1/2002 | Brooks | |
| 2004/0100386 A1 | 5/2004 | Tendler | |
| 2004/0212493 A1 * | 10/2004 | Stilp | G06K 7/0008 340/531 |
| 2005/0274463 A1 * | 12/2005 | Becker | 160/98 |
| 2006/0033623 A1 * | 2/2006 | Hines et al. | 340/572.1 |
| 2006/0119469 A1 * | 6/2006 | Hirai et al. | 340/5.61 |
| 2006/0252366 A1 * | 11/2006 | Eu | 455/3.06 |
| 2006/0289650 A1 * | 12/2006 | Taylor et al. | 235/451 |
| 2007/0125306 A1 * | 6/2007 | Beecher | 119/51.02 |
| 2007/0139202 A1 * | 6/2007 | Austin | 340/572.8 |
| 2007/0205873 A1 * | 9/2007 | Mickle | G06K 19/0707 340/10.33 |
| 2007/0236336 A1 * | 10/2007 | Borcherding | 340/10.34 |
| 2007/0290811 A1 * | 12/2007 | Tuttle | 340/10.1 |
| 2008/0224885 A1 * | 9/2008 | Rodriguez | G07C 9/00182 340/13.27 |
| 2008/0278335 A1 * | 11/2008 | Welte | 340/573.3 |
| 2010/0259611 A1 * | 10/2010 | Keshavarzian et al. | 348/143 |
| 2010/0289618 A1 * | 11/2010 | Crucs | 340/5.61 |
| 2010/0321173 A1 * | 12/2010 | Magner et al. | 340/426.1 |

FOREIGN PATENT DOCUMENTS

| | | |
|---|---|---|
| GB | 2376977 | 12/2002 |
| GB | 2381180 A | 4/2003 |
| GB | 2393245 | 3/2004 |
| GB | 2381180 | 12/2004 |
| GB | 2430331 | 10/2007 |
| GB | 2431431 | 5/2010 |
| JP | 4031580 | 2/1992 |
| WO | WO 95/35609 A1 | 12/1995 |
| WO | WO 98/01837 A1 | 1/1998 |
| WO | WO 00/11592 A2 | 3/2000 |
| WO | WO 02/50782 A2 | 6/2002 |
| WO | WO 2008/041016 A1 | 4/2008 |
| WO | WO 2008/115315 A2 | 9/2008 |

OTHER PUBLICATIONS

European Search Report & Written Opinion froni co-pending Application EP10187234, completion date Jan. 26, 2011.
European Search Report & Written Opinion from co-pending Application EP10187234, completion date Jan. 21, 2011.
European Examination Report for EP Application No. 09702487.1 dated Apr. 9, 2013.
A Communication pursuant to Article 94(3) EPC dated Oct. 2, 2013 from corresponding European Application No. 09702487.1.
A Communication pursuant to Article 94(3) EPC dated Jun. 3, 2014 from corresponding European Application No. 09702487.1.

* cited by examiner

RFID PET DOOR

CROSS REFERENCE TO RELATED APPLICATIONS

This application is a U.S. national stage application of international application PCT/GB2009/050026, filed Jan. 14, 2009, which in turn claims priority to GB08/00819.5, filed Jan. 17, 2008 and under 35 U.S.C. §119(e) to 61/023,013, all in the name of Nicholas Patrick Roland Hill, all incorporated by reference herein.

FIELD OF INVENTION

Embodiments of the invention relate to the field of RFID readers, particularly RFID readers used in pet doors to control access for a pet bearing an RFID tag or implant.

BACKGROUND TO THE INVENTION

A pet door allows convenient access of a pet to a home, however unrestricted access can lead to problems. For example, pets from neighbouring homes or other animals may also access the house, eating food or leaving mess. Furthermore, if the pet door is large enough, for example for a large dog, then this can be a security hazard, allowing access to people as well as animals. It is therefore desirable to limit access to the owner's pets only.

Controlled access pet doors are well known, including doors that open in response to a tag worn by the animal, for example on a collar. Examples of tags include a magnet, an infra-red transmitter, a radio transmitter, and a passive radio transponder worn by the pet. Examples of such systems may be found in the following references: US2002011217, GB2393245, JP4031580, and U.S. Pat. No. 4,497,133.

Another option for the animal tag is radio frequency identification (RFID). This may take the form of a collar-mounted tag or a transponder that is implanted under the skin of the animal. This latter case has the advantage of achieving controlled access without the animal having to wear a collar and external tag; these can become lost or snagged on branches, etc. Pet doors operating on RFID tags or sub-dermal transponders are well known, for example DE4124143, U.S. Pat. No. 5,992,096, U.S. Pat. No. 6,297,739, GB2376977, GB2381180, U.S. Pat. No. 6,944,990, US2004/0100386, GB2431431, GB2430331, PCT/GB2007/050540.

Pet doors that provide controlled access are preferably powered by batteries with a long lifetime. It is therefore important to minimise power to extend lifetime. When an ID tag is supplied with the pet door then the system can be optimised for that tag, only using sufficient power for reliable operation. However, operation with sub-dermal transponders that may already be in the animal for ID purposes presents additional challenges that reduce battery life.

An international standard for pet microchipping (ISO11785) has been adopted in many countries around the world. This standard recommends a full-duplex (FDX) transponder operating at a frequency of 134 kHz, and with a defined modulation scheme. However, many transponders that are present or still being implanted in animals do not adhere to this standard. The most notable example of this is the USA where the ISO standard is not well established at the time of this application. In the USA there are a range of different transponders in operation that encode the ID number in different ways and may operate at different frequencies; examples of common frequencies are 125 kHz, 128 kHz, and 134 kHz. In addition to full duplex transponders there are also half duplex transponders. Even in countries that have adopted the ISO standard there are still legacy chips in place that present the same problem of transponders that operate at different frequencies and have different coding schemes.

In order to determine the ID code of an arbitrary transponder a single read at one frequency may be carried out. However this can only match one transponder frequency and transponders designed to operate at other frequencies will be limited in range. In order to achieve adequate read range for all transponders the reader field would have to be raised to high levels, drawing high levels of power.

An alternative that allows the reader to work with a wide population of transponders in various countries is to operate with multiple frequencies and multiple modulation schemes. Testing for all transponders would therefore require repeated measurements, again drawing high levels of power.

Another feature of the set of transponders implanted into pets is that their ranges are not identical. For example, the technology has become better optimised over time, meaning that older transponders tend to have reduced range. In order to work with as wide a population as possible there is a requirement for high reading fields. The amplitude of the reader field may be set high, so that there is adequate range for the worst case transponders. However, this has the drawback that high levels of power would be required.

In summary, an RFID pet door that works with a wide range of different transponders that are present in animals can require high levels of power, and a correspondingly short battery life. There is therefore the need for such an RFID pet door with improved efficiency for a given range, or equivalently improved range for a given efficiency.

SUMMARY OF THE INVENTION

The invention is set forth in the independent claims.

In embodiments an RFID pet door incorporates an RFID reader that operates in one of at least two different modes. The first mode, learn mode, learns the ID code of an RFID transponder in the vicinity of the reader and stores that code in memory. The transponder may be a sub-dermal implant in an animal. The RFID reader also derives additional reader information corresponding to the RFID transponder.

The learn mode is able to read transponders from a chosen set of different transponder types. The differences between the transponders in the chosen set may include:
1) Transponders with different designed operating frequencies.
2) Transponders with different ranges.
3) Transponders with different modulation schemes.
4) Transponders with or without encryption.
5) Transponders that incorporate at least one sensor, such as a temperature sensor.
6) Transponders that return a corrupted code below a given read field.
7) Transponders with different times required to send a complete ID code.
8) Transponders that are full duplex or half duplex.

In order to read the chosen set of transponders the RFID reader may attempt to read the transponder at multiple different frequencies. All frequencies of transponders within the chosen set may be tested. Alternatively the reads at different frequencies may be stopped once a valid read has been registered. The amplitude of the reader field at each frequency is chosen to be large enough to reliably read the transponders from the chosen set corresponding to that frequency. A number of different modulation schemes may be used to determine at least one ID code from the signal returned from the RFID transponder. The reader may choose only those modulation schemes that are present in the chosen set at the corresponding reader frequency. The reader may test for full duplex and/or half duplex transponders.

The additional reader information derived for each of the RFID transponders stored in learn mode may include:
1) The operating frequency of the transponder.
2) The amplitude of the reader field required for reliable operation with the transponder.
3) The modulation scheme of the transponder.
4) Whether the transponder incorporates additional sensors, such as a temperature sensor.
5) Whether the transponder returns a corrupted code when read below a given field amplitude.
6) Whether the code returned by the transponder is encrypted.
7) The times required for the transponder to send a complete ID code.
8) Whether the transponder is full duplex or half duplex.

The additional reader information may be derived from the process of carrying out the learn mode. For example the frequency of the tag may be determined from the relative amplitude of the returned signal from the RFID transponder measured for each different frequency at which an attempted read is carried out. Alternatively the frequency and modulation scheme may be derived from the reader settings that returned the valid ID code that was stored in learn mode.

The additional reader information may be at least partly derived from the ID code or numbers within the ID code. For example certain numbers within the ID code can be used to identify the manufacturer and the age of the tag. This may be used together with lookup tables of known transponder characteristics to derive at least part of the additional reader information.

The additional reader information may be derived from a combination of the process of carrying out the learn mode and the ID code. The additional reader information may at least in part be stored in memory during the learn mode.

The second mode in which the RFID reader may operate, normal mode, compares the ID codes stored in memory to the RFID signal returned from an RFID transponder in the vicinity of said RFID reader. The behaviour of the RFID reader is at least in part determined by the additional reader information corresponding to the ID codes stored in memory.

The RFID behaviour may include:
1) Reading the RFID transponder with a set of different frequencies taken from a reduced set. The reduced set may be compiled from the additional reader information and includes only the frequencies of the transponders stored in memory. All the frequencies in the reduced set may be used in attempted reads of the transponder, or the attempted reads may be halted after a valid read has been registered. The reduced set may include only one frequency.
2) The amplitude of the RFID reader may be taken from a list of amplitudes for each frequency at which an attempted read is carried out. The list of amplitudes may be compiled from the additional reader information and corresponds to an amplitude at which the stored transponders at this frequency may be reliably read. This amplitude may be lower than the maximum possible reader amplitude at this frequency, and/or the amplitude used by the reader at this frequency in learn mode.
3) The modulation scheme used by the RFID reader to decode the RFID signal returned from the transponder may be taken from a list of schemes for each frequency. The list of schemes may be compiled from the additional reader information and corresponds to the stored transponders at this frequency.
4) Certain types of tag return a corrupted code below a minimum reader field strength. The potential to return such a corrupted code may be included in the additional reader information. When comparing a stored code to the signal returned from an RFID transponder, the known corruption may be applied to the stored code and also compared to the signal. This process may extend the range of the reader for a given power input.
5) The acquisition time used by the RFID reader to acquire the RFID signal returned from the transponder may be taken from a list of acquisition times for each frequency. The list of acquisition times may be compiled from the additional reader information and corresponds to the maximum acquisition time for the stored transponders at this frequency.
6) The use of the reader as a full duplex reader or half duplex reader may be taken from a list for each frequency. The list may be compiled from the additional reader information and corresponds to the presence of full duplex and/or half duplex transponders among the stored transponders at this frequency.

The various examples of possible reader behaviour determined by the additional reader information have in common that they may reduce the average power required to carry out the RFID read function in normal mode. The power required to reliably read the RFID transponders whose ID codes are stored in memory may be reduced in comparison to the average power required to reliably read all types of RFID transponder that may be stored by the learn mode.

In embodiments, the RFID reader may incorporate error checks in the learn mode to confine that the ID code that has been read is a valid ID code. These error checks may include:
1) A CRC check
2) A parity check
3) A check for a valid header sequence
4) A signal to noise check In embodiments, the normal mode may also include error checks for a valid ID code before comparison between the measured ID code and at least one stored ID code. The confidence threshold to pass the error checks in normal mode may be less than in learn mode. Alternatively, there may be no error checks used in normal mode.

In embodiments, the RFID reader in normal mode may calculate no error checks from the signal returned by the RFID transponder. Instead the RFID reader may determine whether the signal returned by the RFID transponder is consistent with at least one stored ID code. For example the RFID reader may calculate the widths between transitions in the signal returned by the RFID transponder. The transition widths may be compared to the expected transition widths for at least one stored ID code. Ambiguous cases where the transition widths do not clearly correspond to logic 1 or logic 0 may be ignored in this comparison and consistency confirmed unless there is a clear mismatch.

The difference in confidence thresholds between the learn mode and normal mode may increase the reliable read range of the normal mode for a given reader field strength.

Similarly by using a consistency check in normal mode instead of determining a full ID code, an increase in the reliable read range may be obtained. Alternatively, any such increase in read range may also be used to save battery life by operating with a lower reader field.

In embodiments, when multiple transponder types are stored, the order that they are tested for in normal mode may be varied for beneficial effect. The variation of test order may increase the likelihood that a valid pet is registered with a reduced number of reads, thereby saving battery life. Various schemes may be used for determination of the best order for transponder testing, including:

1) Testing for the transponder type in order of the number stored in memory of that type.
2) Monitoring the frequency of usage of the door by transponder type and using this to determine the test order.
3) Testing for the most recently stored transponder type first.

In embodiments, the RFID reader may operate with RFID transponders that return an encrypted ID code. An example of such an encrypted transponder is produced by AVID. The encryption algorithm may not be known or require excessive calculation to yield the decrypted ID code. The RFID reader may operate in learn mode and store the encrypted ID of the transponder in memory. The presence of encryption may be included in the additional reader information. The RFID reader may operate in normal mode and compare the measured ID of a transponder with at least one encrypted ID code stored in memory. No decryption is applied to the measured ID code in normal mode. A match may therefore be made between a measured transponder and a stored transponder without the use of decryption.

In embodiments, when the RFID reader determines the ID code of a transponder or determines a match between the signal returned from an RFID tag and a stored ID code then the reader may also determine whether the transponder incorporates additional sensors. An example of this is the Bio-Thermo transponder produced by Digital Angel. The presence of sensors may be determined from the measured ID code and/or the additional reader information when a match to a stored code is made. When the presence of a sensor is determined then the reader may also activate the sensor in the transponder to measure its environment and return the measurement to the reader.

In embodiments an RFID pet door may incorporate the above ability to recognise and measure the sensor in a transponder. The sensor may be activated when an animal bearing such a transponder is registered by the pet door. The sensor output may be logged and/or displayed on a display screen. The sensor may be a temperature sensor.

In embodiments the reader may be controlled by a CPU. The CPU may control the radio frequency stimulus applied to an antenna to energise the RFID transponder. The CPU may also control a tuning circuit to adjust the resonant frequency of the antenna. The same antenna may be connected to an analogue signal conditioning circuit and then on to an ADC for sampling the antenna waveform. The digital code generated by the ADC may be passed to the CPU which may apply decoding schemes to yield an ID code. The sampling may take place at the same time as the radio frequency stimulus or may take place after the radio frequency stimulus. A single antenna may be used to generate the radio frequency stimulus and receive the returned signal from the RFID tag or alternatively different antennae may be used for each of these two purposes. The CPU may be connected to two different types of memory, volatile memory such as SRAM and non-volatile memory such as EEPROM. The volatile memory may be used to store temporary data as required to carry out operation of the RFID reader. The non-volatile memory may be used to store ID codes that have been read in learn mode.

The RFID reader disclosed in the embodiments is by no means limited to applications in a pet door. Many RFID systems benefit from the methods disclosed including:

1) A pet feeder incorporating an RFID reader
2) A livestock monitoring system incorporating an RFID reader.
3) A controlled access system incorporating an RFID reader
4) Any RFID system incorporating an RFID reader where the RFID system has two modes, a first mode that stores an ID code from a population of different types of transponder, and a second mode that reads the ID code from a population of the stored transponder types only.

In embodiments, an RFID reader may read RFID transponders that include:

1) Collar mounted tags on animals
2) Sub-dermal implants in animals
3) A bolus sitting inside an animal.
4) Any common RFID transponder form factor.

In embodiments, an RFID reader may read RFID transponders that include full duplex transponders and half duplex transponders.

The term transponder is used in this document to denote any radio frequency tag device that returns a reply signal on proper electronic interrogation. The reply signal may be transmitted back to the reader or generated via load modulation. The transponder may be an active device, having its own power source such as a battery, or may be a purely passive device.

Applications of the embodiments are not limited to frequencies around this band, and extend to include all frequencies ranging from sub-sonic to microwave frequencies and beyond. All common RFID frequency bands are included, such as 125 kHz, 134 kHz, 13.56 MHz, 869 MHz, 915 MHz, and the like.

DETAILED DESCRIPTION OF EMBODIMENTS

Figure 1:
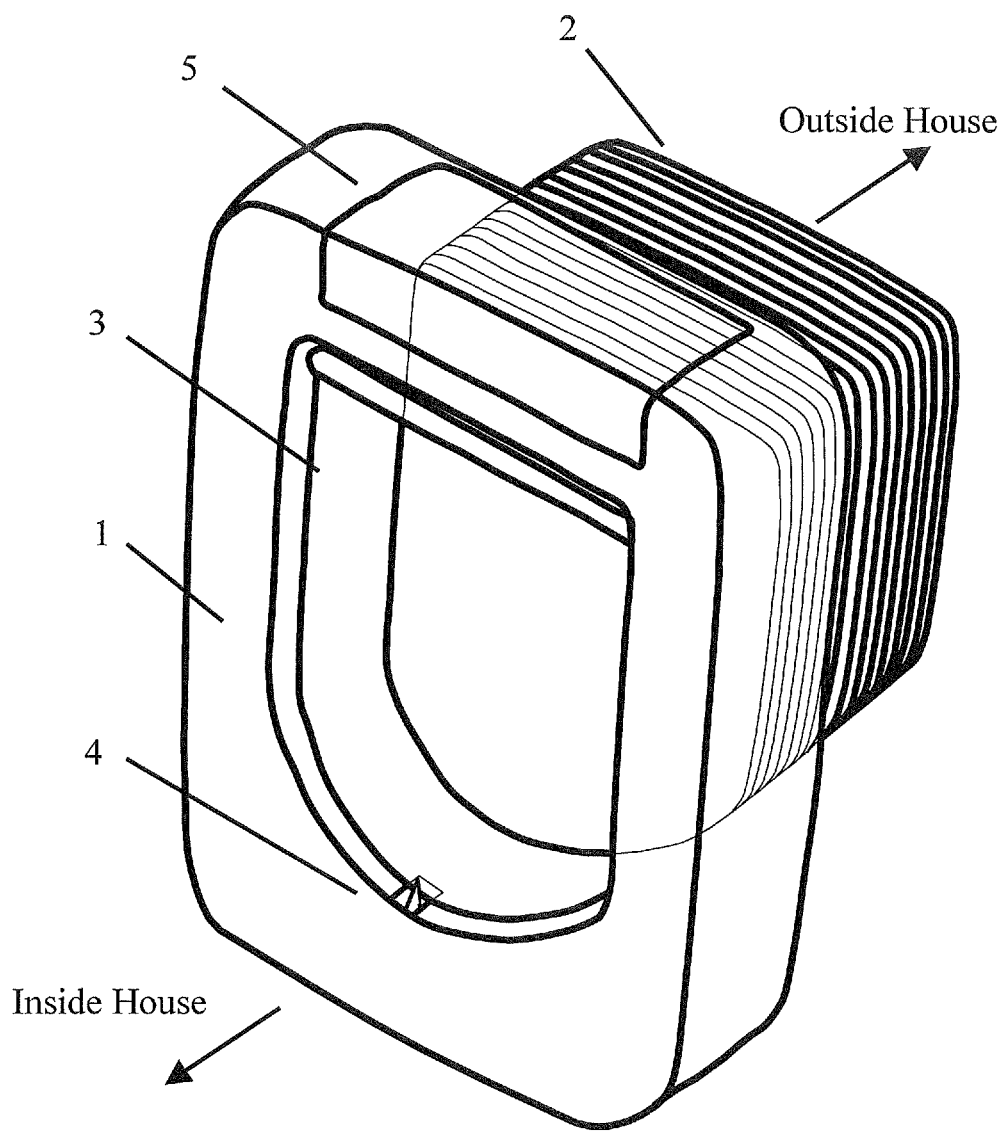
FIG. 1 is a diagram of an embodiment of a RFID pet door.
Figure 2:
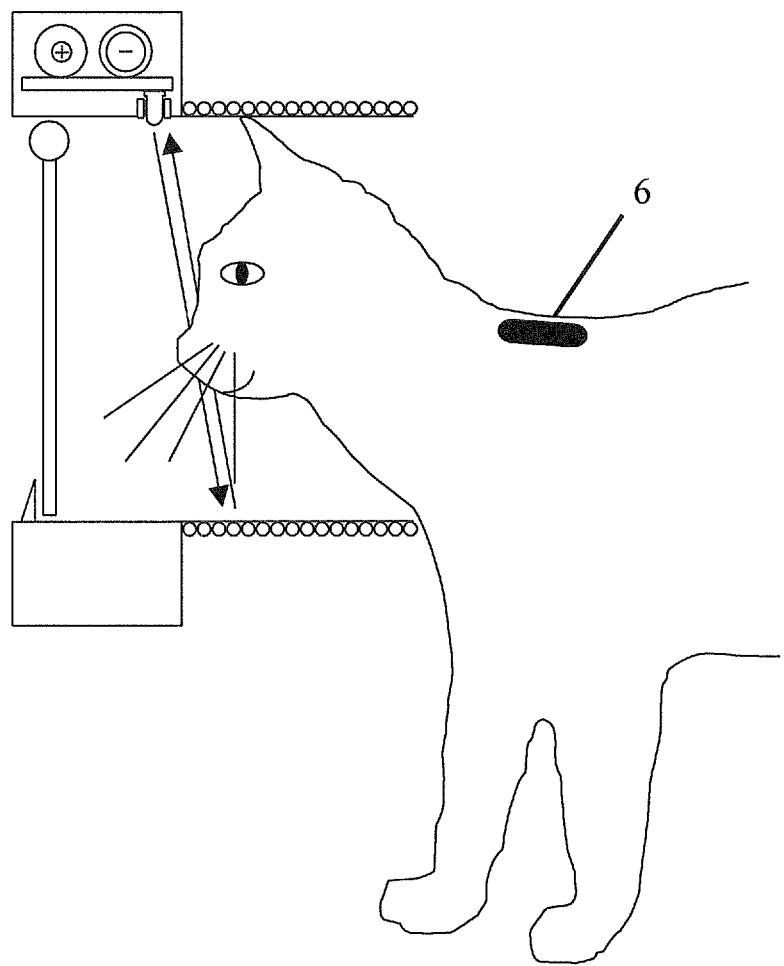
FIG. 2 is a side view of a cat with an embedded transponder about to enter a house through the cat flap.

FIG. 1 shown an embodiment of an RFID pet door. The diagram shows the main assembly 1, an RFID antenna 2, a door 3, an electronic lock 4, and a battery compartment 5. The side view of such a pet door is shown in FIG. 2 together with an animal entering the house with an embedded transponder 6. The pet door incorporates an optical detector consisting of an infra-red LED and photodiode. The LED sends light into the tunnel that reflects off the bottom surface of the tunnel back up to the photodiode. The level of light reflected off the tunnel bottom is measured by the photodiode and a reference level determined.

When a cat attempts to enter the house it puts its head inside the tunnel and this interrupts the light. The level of light measured at the photodiode therefore drops and this attenuation is registered by the pet door as indicating the presence of an animal. At this point the reader is powered up and an attempt is made to determine the ID code of an RFID transponder embedded under the skin of the cat. When the measured ID code matches one stored in memory the door lock is opened and the animal is allowed to enter the house.

Figure 3:
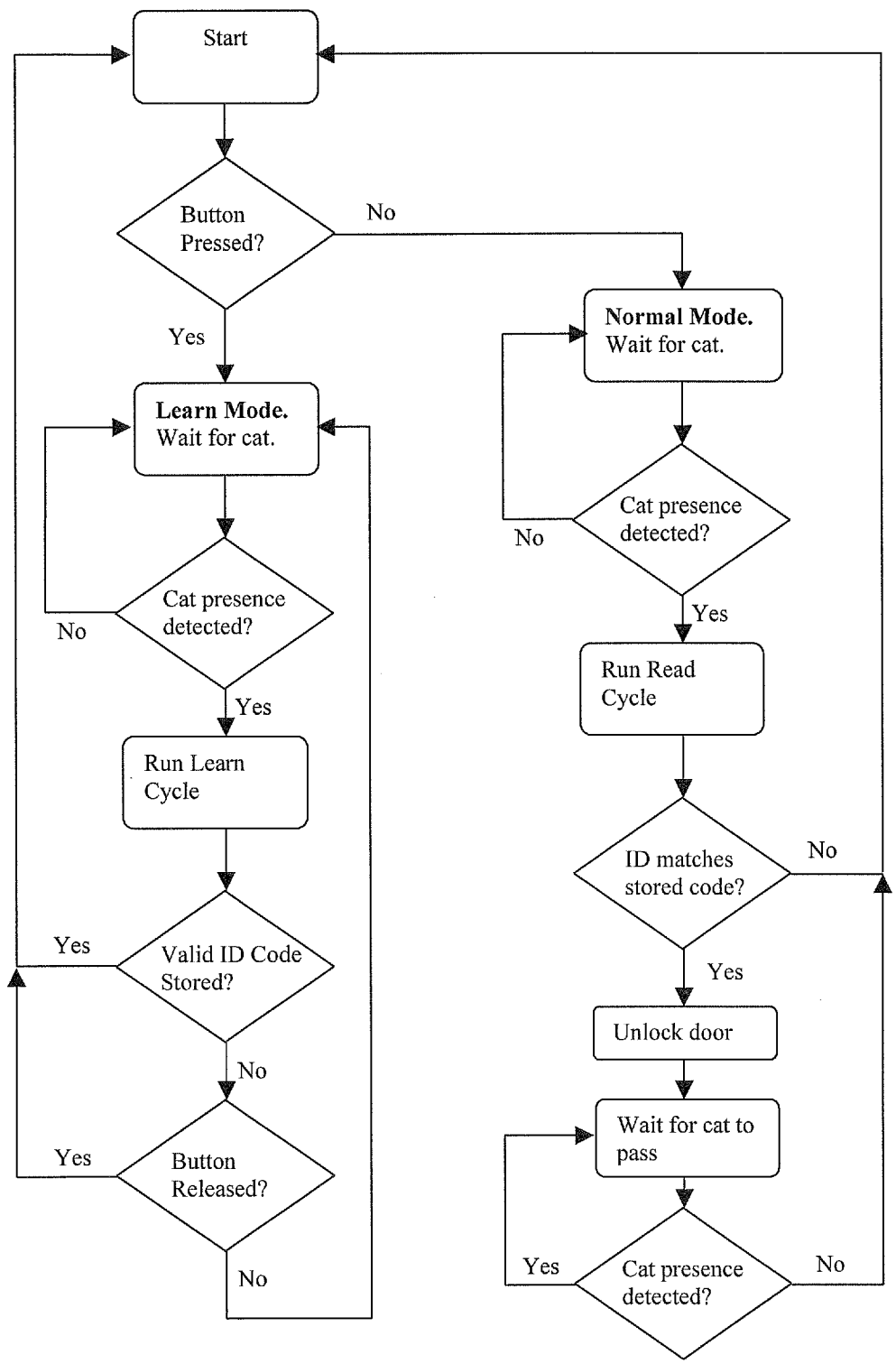
FIG. 3 is a block diagram of an embodiment of the pet door operation showing learn mode and normal mode.

FIG. 3 shows a block diagram of the two modes of operation of an embodiment of the pet door. The choice of normal mode or learn mode is made in response to the owner pressing a learn button. If the button is pressed then the door enters learn mode and carries out a learn cycle when a cat is registered in the tunnel by the optical sensor. The learn mode is cancelled if a valid ID code is stored into memory during the learn cycle or alternatively the learn mode is cancelled by releasing the learn button. If the learn button is not pressed then the door enters normal mode and performs a read cycle when a cat is registered in the tunnel by the optical sensor. When the measured ID code matches one of the codes stored in memory then the door lock is opened and kept open until the cat passes through the tunnel.

The learn mode and normal mode are now described in more detail, particularly with reference to the amplitude and frequency of the RFID reader output and the confidence thresholds for determination of the measured ID codes.

Figure 4:
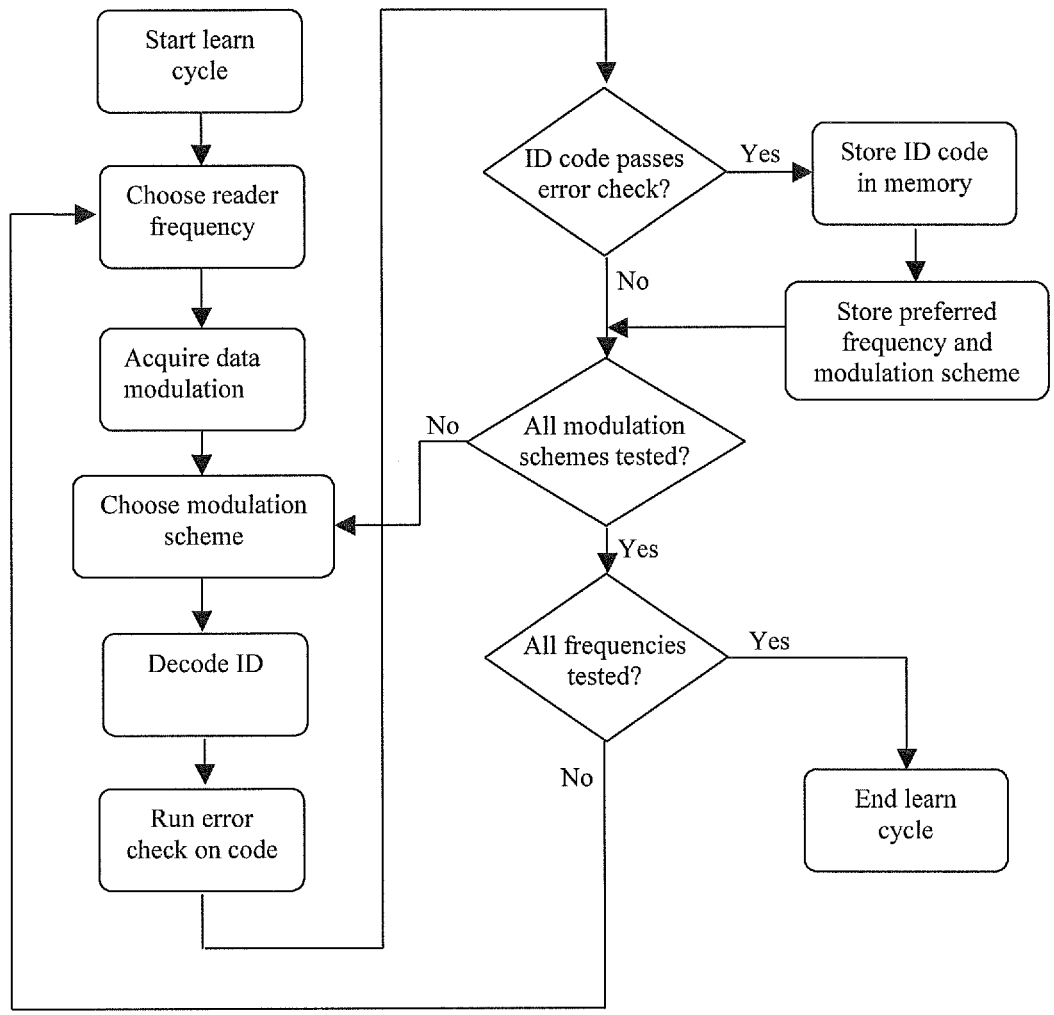
FIG. 4 is a block diagram of an embodiment of the learn cycle.

FIG. 4 shows a block diagram of the learn cycle. At the start of the learn cycle the frequency of the reader field is chosen from a list of common transponder frequencies. This list may include one of 125 kHz, 128 kHz, 134 kHz. The reader is then activated at this frequency. The amplitude of the reader field is chosen to be the largest available, giving the maximum range for all types of transponder.

The reader next samples the modulation signal generated in the reader by the transponder. The modulation is sampled over a time sufficient to include the full ID code generated by each type of transponder at this frequency. Each modulation scheme that is possible for transponders at the chosen frequency is used to demodulate the sampled signal to yield an ID code. Each ID is also error checked for consistency. This error checking may include:
1) CRC check
2) Parity check
3) Check for presence of a valid header preceding the data code.
4) A signal to noise check Only if the ID code passes the chosen error checks is the ID code stored in memory.

Under most circumstances the learn cycle will only return one frequency and modulation scheme that gives a valid ID code, also passing the error checks. However if multiple cases return a valid ID then an extra step may be carried out to determine the best choice of frequency and modulation scheme that will maximise read range. Examples of such extra steps include:

1) Storing the average amplitude of the sampled modulation. The best choice of frequency is likely to have the largest amplitude of modulation.
2) Certain numbers within the ID code can be used to determine the expected frequency and modulation scheme. One example is the manufacturer code. These codes can be compared to a lookup table and the correct frequency and modulation scheme confirmed.

In addition to the ID code, additional reader information may also be stored corresponding to that code. The additional reader information may be derived from the read cycle or by analysis of the ID code and comparison to stored information. The additional reader information may include:
1) The frequency at which the transponder should be read for maximum range
2) The amplitude required for the reader field to achieve reliable operation of the pet door with the transponder.
3) The modulation scheme required to obtain the ID code.
4) The type of transponder, for example whether it is an ID transponder only or whether it includes additional functions such as the temperature sensing capability of the Bio-Thermo transponder manufactured by Digital Angel.
5) Whether the data returned by the transponder in question becomes corrupted at low reader fields. One example of this is a group of transponders manufactured by Digital Angel that return a corrupted code below a given field strength.
6) Whether the transponder is encrypted, as is the case for some transponders produced by AVID.
7) The time required for the transponder to send a complete ID code.
8) Whether the transponder is full duplex or half duplex.

The additional reader information may be completely stored in memory alongside the ID code. Alternatively, some or all of the additional reader information that is derived from the ID code may not need to be stored. Instead it may be calculated from the ID code when it is required, thereby saving memory.

The result of successful operation of the learn mode is one or more ID codes in memory together with additional reader information for each ID code. The additional reader information informs the best setup for the reader when operating with the corresponding ID code.

Figure 5:
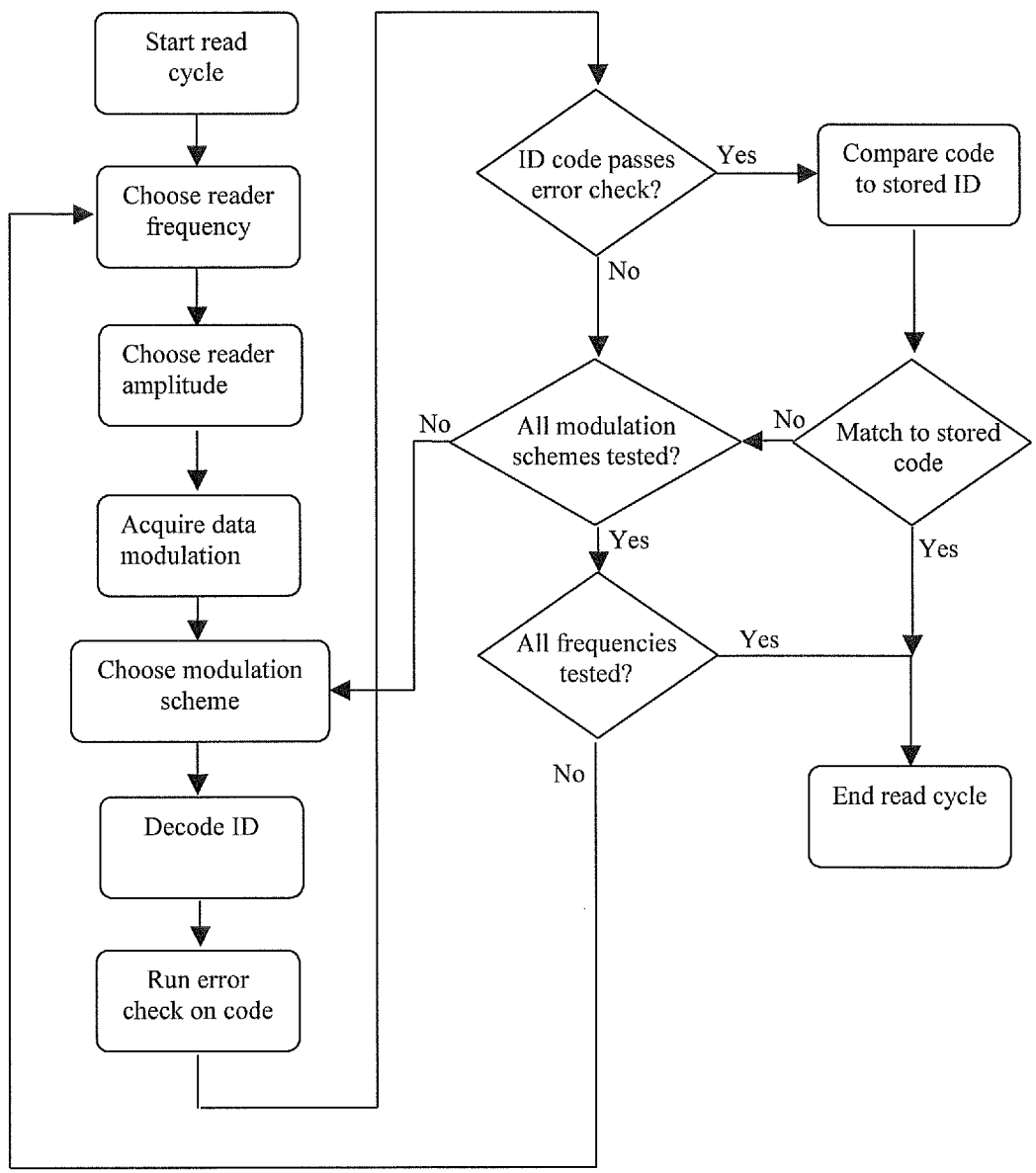
FIG. 5 is a block diagram of an embodiment of the read cycle.

FIG. 5 shows a block diagram of an embodiment of the read cycle. At the start of the read cycle the frequency of the reader is chosen from a list frequencies. The additional reader information for each transponder stored in memory may include the read frequency for each transponder. This allows the list of frequencies to be compiled for only those transponders stored in memory. This list of frequencies may be smaller than the complete list of possible transponder frequencies used in the learn cycle. For example if the owner has only one pet then only one frequency is required for the read cycle. Alternatively the owner may have multiple pets but these will often have been implanted with transponders by the same vet, in which case they would be likely to have a single frequency. Even where the owner has multiple animals with different frequency transponders in each animal the list of frequencies required for all the stored transponders may still be smaller than the complete list. Any reduction in the size of the list of frequencies reduces the number of times that the reader is activated for the read cycle. This provides a direct saving in battery life.

At each frequency the amplitude of the reader interrogation field is chosen. The additional reader information for each transponder stored in memory may include the amplitude required to achieve reliable operation of the pet door. For example the amplitude required to reliably read the latest ID transponders may be smaller than that required for old transponders or transponders including additional functions such as temperature sensing. The amplitude required for each of the transponders stored in memory that operate at the chosen reader frequency may be analysed. The largest required amplitude is chosen from this group. This gives the reader the minimum amplitude required to reliably read all the transponders stored in memory at the chosen frequency. This amplitude may be smaller than the maximum amplitude of the reader used in the learn cycle, thereby providing a direct saving in battery life.

At each frequency the data modulation signal is sampled over a time period sufficient to contain the complete ID code for the chosen frequency. This required acquisition time may be included in the additional reader information. The sampled modulation is demodulated with a modulation scheme taken from a list. The additional reader information for each transponder stored in memory may include the modulation scheme for each transponder. This allows the list of modulation schemes to be compiled for only those transponders stored in memory that also operate at the frequency chosen for the reader operation. This list of modulation schemes may be smaller than the complete list of possible transponder frequencies used in the learn cycle.

Each decoded ID is then error checked. This error checking may include:
1) CRC check
2) Parity check
3) Check for presence of a valid header preceding the data code.
4) A signal to noise check.

The error check may require a lower confidence threshold to pass than the learn cycle. For example it may include a smaller number of error checks such as checking for a valid header only, rather than also checking for CRC, parity, and signal to noise. Alternatively it may have no requirement to pass any error checks.

The reduced confidence threshold for the read cycle is unlikely to cause false opening of the pet door. There are a very large number of possible codes and the likelihood of a chance of a match to the small number of codes stored in memory is low. This reduced confidence threshold may however increase the range over which the pet door is able to reliably determine that a match to a stored code has taken place. Such an increase in the range of a read cycle allows a lower field amplitude to be chosen for each transponder, thereby providing a direct saving in battery life.

If the decoded data is identical to one stored in memory then the read cycle is stopped and a valid read indicated. At this point the door may be opened for the pet.

If the decoded data does not match one stored in memory then the remaining modulation schemes and frequencies are used. This continues until either a valid code is registered or the full set of modulation schemes and frequencies are complete.

This embodiment of the read cycle shows how the additional reader information may be used to minimise the amplitude and number of reads that the reader carries out. This provides a saving in battery life.

Figure 6:
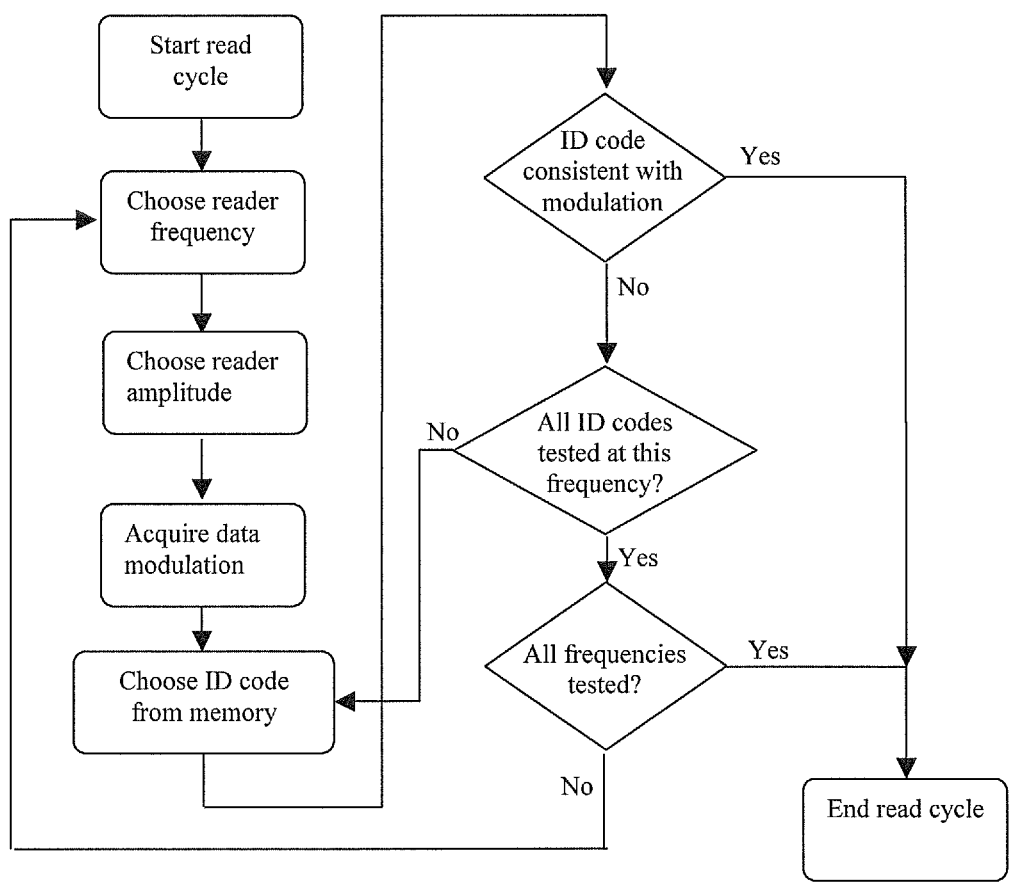
FIG. 6 is a block diagram of an alternative embodiment of the read cycle.

FIG. 6 shows an alternative embodiment of the read cycle. This embodiment includes the same selection of frequency and amplitude from the additional reader information of each of the stored codes. However, this embodiment carries out the comparison to the reader ID codes in a different manner. When the sampled modulation is stored, each of the ID codes that correspond to the chosen frequency are compared to the sampled modulation. If the sampled modulation is consistent with the chosen ID code then a valid match is confirmed and the read cycle is terminated. If the sampled modulation is not consistent with any of the ID codes for the chosen frequency then the remaining frequencies are tested.

The comparison described for this embodiment may allow greater flexibility for the acceptance of a valid code. For example the time between transitions may be measured and compared to the expected transition widths corresponding to logic 1 and logic 0. If the measured transition is not clearly one of these two expected values due to distorted line shapes or the presence of noise then the comparison may still be accepted. The comparison may be rejected only where there is clearly a logic 1 where a logic 0 is expected, or a logic 0 where a logic 1 is expected. In this manner a reliable read cycle may be carried out at a lower field amplitude, thereby providing a direct saving in battery life.

Figure 7:
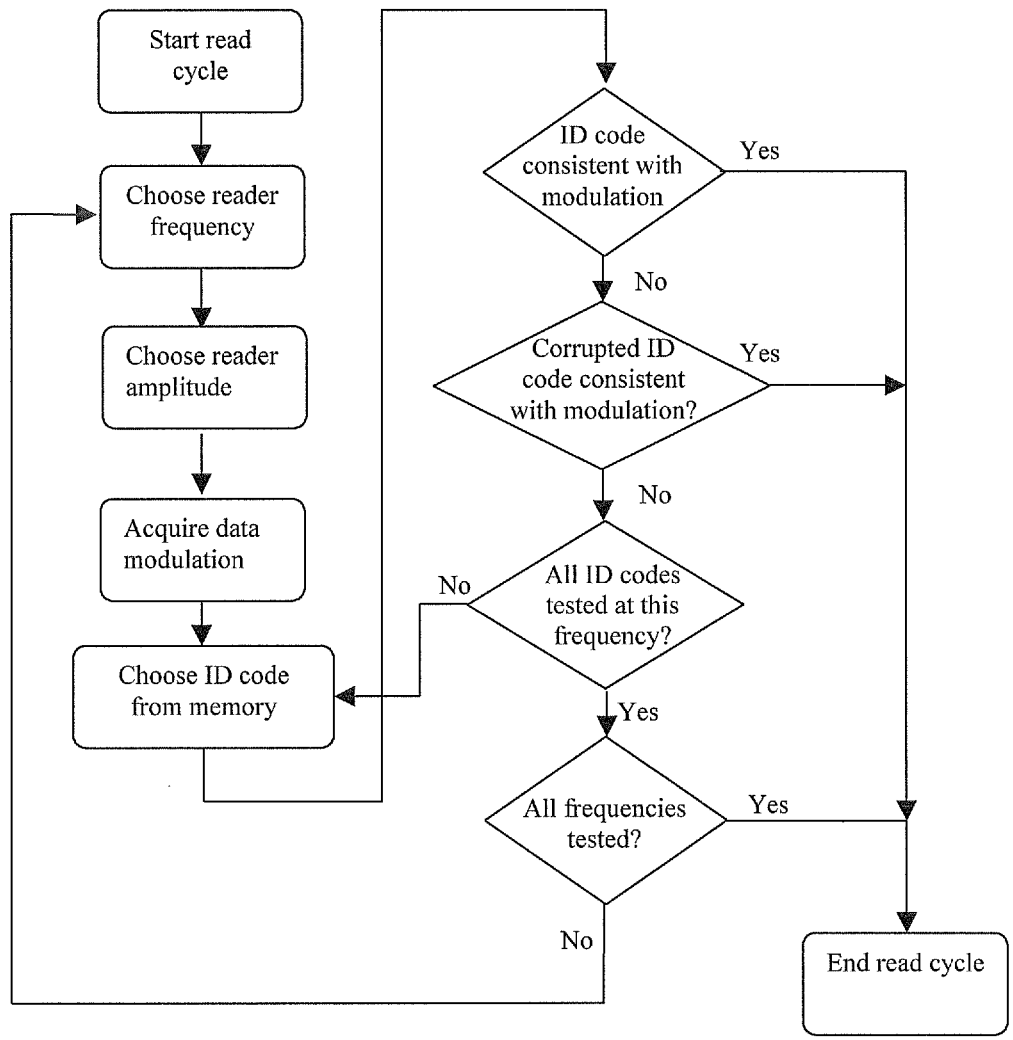
FIG. 7 is a block diagram of an alternative embodiment of the read cycle.

FIG. 7 shows a further embodiment of a read cycle. This example is similar to the previous embodiment with one extra step. It has been observed that some transponders return a corrupted signal below a minimum interrogation field strength. This would normally provide the limit on range, however when the corruption is predictable and repeatable it may still be used for comparison with valid stored ID codes. In order to determine consistency between the measured signal and a stored ID code, first the stored ID code is tested. If no valid comparison is registered, a second comparison is carried out where the known corruption is applied to the stored code beforehand. If a match is determined with this second comparison then it is likely that the measured transponder corresponds to the stored code and the door may be opened. This is a further example where the confidence required for a valid read is lower in the read cycle than the learn cycle. This acts to extend range, allowing operation with a lower reader amplitude, saving battery life.

The embodiment described above of an ID code corruption is limited to the digital code inferred from the sampled modulation. In addition, alternative corruptions have been observed including a change in the timing of the modulation. The various corruptions that are possible come from the fact that the ID transponder is not powered to its proper operating level, resulting in undesirable behaviour. However, provided the corruption is repeatable and predictable then it may still be used in a similar manner to the above embodiment. Where the corruption has the potential to change the timing of the modulation then this may be compensated for in the sampling by the reader or the interpretation of the sampled modulation.

One example of additional reader information is whether the ID code is encrypted. Encryption is applied for some transponders, for example as produced by AVID. A decryption algorithm is required to obtain the final ID code of the transponder that is stored on a database. However, for the purposes of this pet door, the decryption process is not necessary. In learn mode the ID code stored in memory may be the encrypted code. In normal mode the reader may read the transponder and compare the code, without applying decryption, to that stored in memory. A match between the two codes indicates that a valid pet has been recognised, without requiring the decryption to be applied at any point. Alternatively the decryption may be applied if the algorithm is known and if this leads to benefits, for example increased facility for error checking, or alternatively reduced memory storage required on the final ID code.

Figure 8:
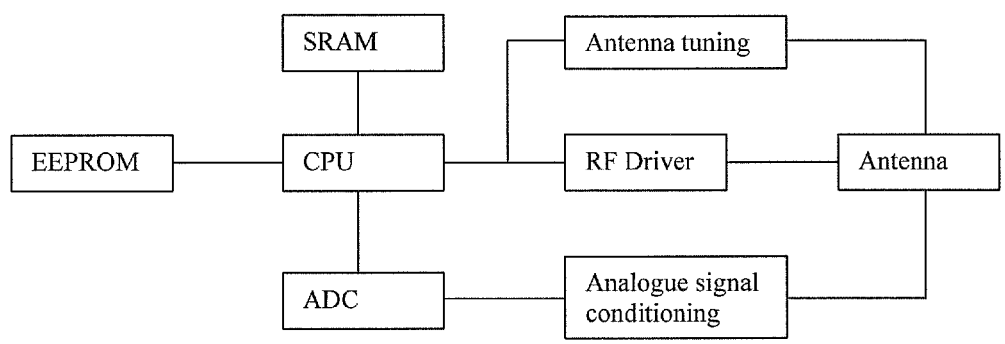
FIG. 8 is a block diagram of an alternative embodiment of an RFID reader.

FIG. 8 shows a block diagram of an embodiment of a RFID reader. The reader is controlled by a CPU. The CPU controls the radio frequency stimulus applied to the antenna to energise the RFID transponder. The CPU also controls a tuning circuit to adjust the resonant frequency of the antenna. The same antenna is connected to an analogue signal conditioning circuit and then on to an ADC for sampling the antenna waveform. The digital code generated by the ADC is passed to the CPU which applies decoding schemes to yield an ID code. When the reader is attempting to read a full duplex transponder then the sampling takes place at the same time as the radio frequency stimulus. Alternatively, when the reader is attempting to read a half duplex transponder then the sampling takes place after the radio frequency stimulus. In this embodiment a single antenna is used to generate the radio frequency stimulus and receive the returned signal from the RFID tag. Alternatively, a different antenna may be used for each of these two purposes. The CPU is connected to two different types of memory, SRAM and EEPROM. The SRAM is used to store temporary data as required to carry out operation of the RFID reader. EEPROM is be used to store ID codes that have been read in learn mode.

Figure 9:
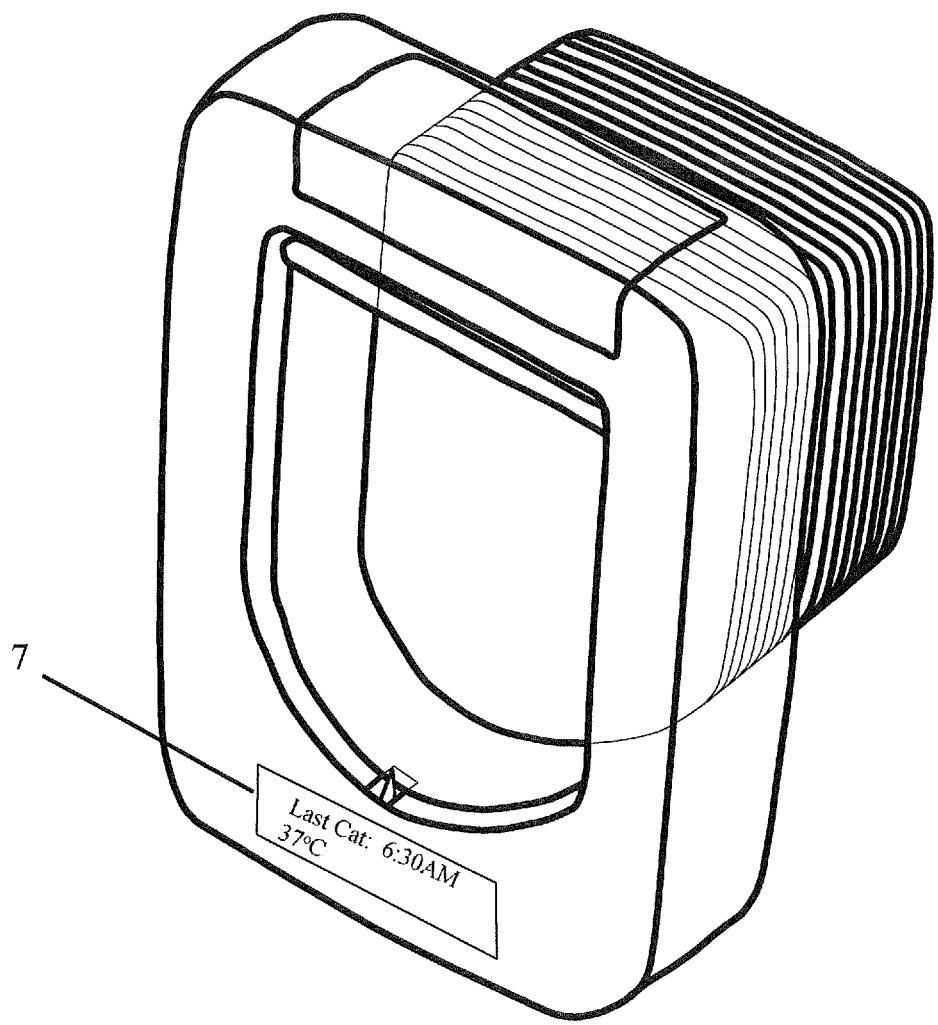
FIG. 9 is a diagram of an embodiment of a pet door with a display screen.

FIG. 9 shows an embodiment of a pet door that includes a display screen 7. The display screen may be used to indicate information about the pet entry or exit, for example which pet last used the door and at what time. The additional reader information for each stored transponder may include whether the transponder has additional functionality. For example the Bio-Thermo transponder produced by Digital Angel includes a temperature sensing capability. When a transponder with such additional functionality is read then the reader may also activate this functionality. For the example of a Bio-Thermo transponder, the temperature of the pet may be read and displayed on the screen. This may be used to indicate whether the pet has a temperature and therefore suggest a visit to the vet.

When multiple transponder types are stored in memory, the order that they are tested for in normal mode may be varied for beneficial effect. The variation of test order may increase the likelihood that a valid pet is registered with a reduced number of reads. For example if a large number of animals with 125 kHz transponders are stored in memory, together with a small number of animals with 134 kHz transponders then it would be beneficial to test the 125 kHz frequency first. Then the read cycle may be stopped if one of the 125 kHz transponders is registered, avoiding the power loss associated with also testing for 134 kHz; this would save battery life. Various schemes may be used for determination of the best order for transponder testing, including:

4) Testing for the transponder type in order of the number stored in memory of that type.
5) Monitoring the frequency of usage of the door by transponder type and using this to determine the test order.
6) Testing for the most recently stored transponder type first.

In summary, it has been shown how additional reader information may be used to modify the read cycle for increased battery life. Additional reader information is determined either from the ID code or from the learn cycle and may include:

1) The frequency of the transponder.
2) The amplitude required for a reliable read.
3) The modulation scheme required for the transponder.
4) The type of transponder, for example whether it is an ID transponder only or whether it includes additional functions such as the temperature sensing capability.
5) The possibility of data corruption in the code for a transponder measured at low fields.
6) Whether the transponder is encrypted.
7) Whether the transponder is full duplex of half duplex.

In addition it has been shown how a reduced confidence threshold for accepting a valid transponder in normal mode, as compared to learn mode, can result in extension of the read range in normal operation. This can increase battery life.

The embodiments above describe the acquisition of the sampled modulation when the reader field is on. This is the requirement for full duplex transponders, which are the most common form of transponder used for pet identification. Alternatively the reader may acquire the modulation after the reader field has been turned off. This is the requirement for half duplex transponders, which are less common for pet identification. The learn cycle may also include attempted reads of half duplex transponders. The additional reader information for each transponder may include whether the transponder is full duplex of half duplex. The read cycle may include a test for a half duplex transponder at one or more frequencies if this is included in the additional reader information for at least one of the transponders stored in memory.

The embodiments above are of a pet door setup to measure the embedded transponder in a pet. These may equally well be operated by a transponder that is not embedded in the animal but is mounted on its body. Examples include a transponder that is hung from a collar that the animal wears.

The term transponder is used in this document to denote any radio frequency tag device that returns a reply signal on proper electronic interrogation. The reply signal may be transmitted back to the reader or generated via load modulation. The transponder may be an active device, having its own power source such as a battery, or may be a purely passive device.

Figure 10:
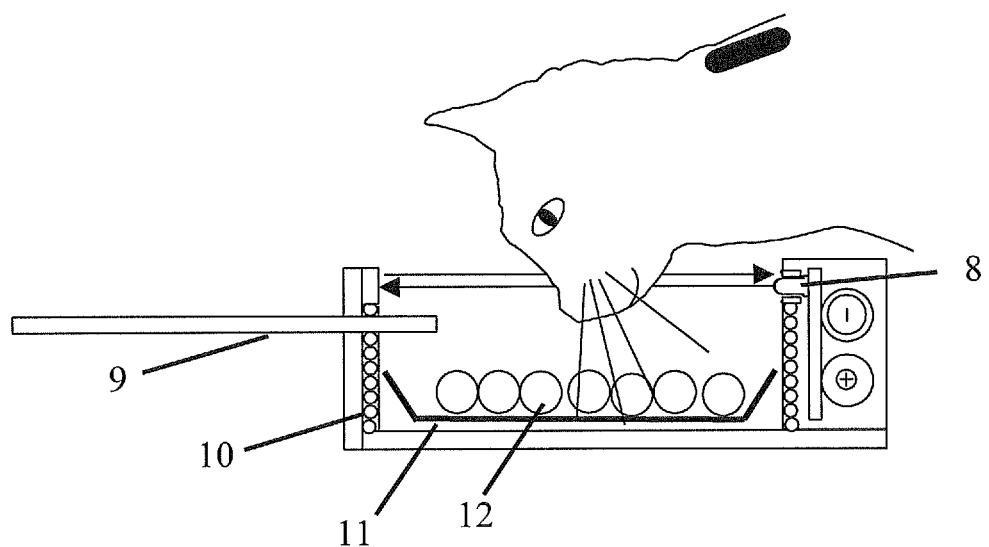
FIG. 10 is a diagram of an embodiment of a pet feeder.

The methods described above may also be applied to alternative products that are required to learn and subsequently recognise the ID of a pet. One example is a pet feeder that only opens for a designated pet, remaining closed for other animals. This product allows control over feeding different animals and also allows food to be left out for an animal in a more hygienic fashion since it remains closed when the animal is not present. FIG. 10 shows an embodiment of a pet feeder including an optical detector 8 to detect the presence of a pet. Also shown are a lid 9 that allows access to the food for a valid pet, an RFID antenna 10, and a dish 11 to hold pet food 12.

In addition to pet identification products, the methods described above may also be applied to any RFID system with a range of different transponders that are required to be recognised. The systems that benefit from these methods include two features:

1) A first mode for determination of an ID code from a population of different types of transponders.
2) A second mode for normal operation where only the stored codes are required to be read. This list may include a reduced number of different transponder types, as compared to the maximum number required for the first mode.

Examples of other RFID systems that may benefit from these methods include:

1) Livestock animal identification, where the members of a given group of animals are monitored after they have been read and stored.
2) A controlled access system, able to operate with multiple types of access card. The various different types of card may be tested for when a new card is added to the system, however only those card types stored in memory are required to be tested in normal operation. The access cards may have different operating frequencies, including 125 kHz, 134 kHz, 13.56 MHz.

Under some circumstances the methods described above may reduce the number of reads needed to test for all the required transponders, for example if a reduced number of read frequencies are required. This not only saves on the power required for each read cycle, but also increases the average speed of response of the RFID system.

Therefore these methods may be applied beneficially even in a system that does not benefit from reduced power, for example a mains powered system.

The frequency band chosen for the embodiments is purely by way of example. Applications of the invention are not limited to frequencies around this band, and extend to include all frequencies ranging from sub-sonic to microwave frequencies and beyond. All common RFID frequency bands are included, such as 125 kHz, 134 kHz, 13.56 MHz, 869 MHz, 915 MHz, and the like.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A pet door comprising: a housing containing a control system including an RFID reader; a door with a lock controlled by said RFID reader; and a tunnel to allow a pet to pass through the pet door; wherein said RFID reader incorporates a learn cycle comprising at least one learn mode, wherein said learn mode reads and stores the ID code from each RFID transponder of a population of different types of transponder in the vicinity of the reader, and wherein the learn mode is able to read transponders from a first set of different transponder types, including transponders with different operating frequencies, for storing said ID code; wherein said RFID reader incorporates a normal cycle comprising at least one normal mode, wherein said normal mode reads ID codes from those RFID transponders having an ID code stored during the learn mode, wherein said RFID transponders having an ID code stored during the learn mode are associated with respective animals; wherein said learn mode, for each said RFID transponder, attempts to read the transponder by interrogating the transponder at multiple different frequencies, receives from the RFID transponder in the vicinity of the reader an ID code of the RFID transponder, and stores the ID code in memory of said RFID reader; and wherein said RFID reader also derives and stores in memory additional reader information from the RFID transponder based on said learn mode, wherein said additional reader information includes at least an operating frequency of said RFID transponder; wherein said normal mode determines a read behavior of said RFID reader at least in part based on the additional reader information corresponding to the ID codes stored in memory and then interrogates an RFID transponder in the vicinity of said RFID reader to receive a signal from the RFID transponder associated with an animal and compares at least one ID code stored in memory of said RFID reader to a signal returned from the read RFID transponder, wherein said interrogation is performed using said determined behavior of said RFID reader, and wherein said determined behavior of said RFID reader comprises reading an RFID transponder with a set of frequencies taken from a reduced set including only the frequencies of the transponders with ID codes stored in said memory, wherein said determined read behavior of said RFID reader reduces the average power required to reliably read said RFID transponders corresponding to said ID codes stored in memory as compared to the average power required to reliably read all types of RFID transponders that may be stored by the learn mode; and wherein the pet door includes a pet sensor and wherein, in response to user selection of said learn mode, the pet door implements said learn cycle when the presence of a pet is registered by said pet sensor.

2. The pet door as claimed in claim 1 wherein said additional reader information is derived at least in part from said ID code.

3. The pet door as claimed in claim 1 wherein said additional reader information further includes at least one item selected from the group consisting of:
the amplitude of said RFID reader required to reliably read said RFID transponder;
the presence of corruption in the return code of said RFID transponder when read at low reader fields;
the presence of at least one sensor in said RFID transponder;
the presence of encryption in the ID code of said RFID transponder;
the time required for said RFID transponder to return a complete ID code; and whether the transponder is full duplex or half duplex.

4. The pet door as claimed in claim 1 wherein said transponder read behavior includes at least one item selected from the group consisting of:
the amplitudes of said RFID reader in each frequency mode;
the modulation schemes used to determine the ID code from the signal returned by said RFID transponder;
the use of a known data corruption applied to said ID codes stored in memory for comparison—with the signal returned by said RFID transponder;
the acquisition time used by said RFID reader to acquire the signal returned by said RFID transponder; and
the use of said RFID reader as a full duplex reader or a half duplex reader.

5. The pet door as claimed in claim 1, wherein said RFID reader also applies error checks to confirm that said ID code is a valid ID code.

6. The pet door as claimed in claim 1 wherein when operated in said normal mode the reader reads the ID code of an RFID transponder in the vicinity of the reader for comparison with one or more stored ID codes, and where said RFID reader applies no error checks on the measured ID code.

7. The pet door as claimed in claim 1, wherein said reader attempts to read the ID code from a set of stored transponder types, and compares said ID code to a set of stored ID codes, wherein the order in which the different transponder types are tested for increases the likelihood that a valid transponder is read with a reduced number of reads.

8. The pet door as claimed in claim 1, wherein when operated in said at least one learn mode the reader stores an encrypted ID code of an encrypted transponder in the vicinity of the reader, and wherein said at least one normal mode compares the at least one encrypted ID code stored in memory of said RFID reader to the RFID signal returned from an RFID transponder in the vicinity of said RFID reader.

9. The pet door as claimed in claim 1, the RFID reader for reading an RFID transponder in the vicinity of the RFID reader, the apparatus comprising a processor or circuitry to:
   read the ID code of said RFID transponder in a learn mode;
   store said ID code in memory;
   derive the additional reader information corresponding to said RFID transponder;
   measure the return signal from said RFID transponder in a normal mode; and compare said measured return signal to at least one ID code stored in memory of said RFID reader to determine a match.

10. The pet door as claimed in claim 1, the RFID reader for reading an RFID transponder in the vicinity of the RFID reader, the apparatus comprising a processor or circuitry to:
    read the ID code of said RFID transponder in a learn mode;
    apply error checks to verify said ID code;
    store said ID code in memory;
    read the ID code of said RFID transponder in a normal mode;
    apply error checks to verify said ID code, wherein the confidence threshold to pass said error checks is below that used in said learn mode; and
    compare said ID code in normal mode to at least one ID code stored in memory of said RFID reader to determine a match.

11. The pet door as claimed in claim 1 wherein said RFID reader is able to determine whether said transponder incorporates a temperature sensor, and to read said temperature sensor when present.

12. The pet door as claimed in claim 5 wherein said error checks include at least one item selected from the group consisting of:
    a CRC check;
    a parity check;
    a check for a valid header sequence; and
    a signal to noise check.

13. The pet door as claimed in claim 5 wherein when operated in said normal mode the reader reads the ID code of an RFID transponder in the vicinity of the reader for comparison with one or more stored ID codes, and where said RFID reader also applies error checks to confirm that said measured ID code is a valid ID code, and where the confidence threshold to pass said error checks is below that used in said at least one learn mode.

14. The pet door as claimed in claim 5, wherein when operated in said at least one normal mode the reader measures the signal returned by an RFID transponder in the vicinity of the reader, and wherein said signal is compared with one or more stored ID codes, and wherein it is determined whether said stored ID codes are consistent with said signal.

15. A method of operating a pet door or pet feeder comprising an RFID reader, the method comprising: using a learn mode for storing an ID code from each RFID transponder of a population of different types of RFID transponder, wherein the learn mode is able to read transponders from a first set of different transponder types, including transponders with different operating frequencies, for storing said ID code; and using a normal mode for reading ID codes from only those RFID transponders having an ID code stored during the learn mode, wherein said RF transponders having an ID code stored during the learn mode are attached to respective animals; wherein using said learn mode comprises, for each said RFID transponder, attempting to read the transponder by interrogating the transponder at multiple different frequencies, receiving from the RFID transponder in the vicinity of the reader an ID code of the RFID transponder and storing the ID code in memory of said RFID reader; wherein using said learn mode also comprises deriving and storing in memory additional reader information, wherein said additional reader information includes at least an operating frequency of said RFID transponder; and wherein using said normal mode comprises: determining a behaviour of said RFID reader at least in part based on the additional reader information corresponding to the ID codes stored in memory, and then interrogating an RFID transponder in the vicinity of said RFID reader to receive a signal from the RFID transponder attached to an animal and comparing at least one said stored ID code to a said signal returned from the RFID transponder, wherein said interrogation is performed using said determined behaviour of said RFID reader, and wherein said determined behaviour of said RFID reader comprises reading an RFID transponder with a set of frequencies taken from a reduced set including only the frequencies of the transponders with ID codes stored in said memory, wherein said determined read behavior of said RFID reader reduces the average power required to reliably read said RFID transponders corresponding to said ID codes stored in memory as compared to the average power required to reliably read all types of RFID transponders that may be stored by the learn mode; the method further comprising automatically implementing said learn mode in response to sensing the presence of a pet in the vicinity of said pet door or pet feeder.

16. The method as claimed in claim 15 further comprising reading a temperature sensor in said transponder.

17. A pet door or pet feeder comprising an RFID reader wherein said RFID reader incorporates a learn cycle comprising a learn mode and a normal cycle comprising a normal mode,
    wherein said learn mode interrogates one or more RFID transponders of a population of different types of transponders and, in response to the interrogation, reads and stores at least one ID code from one or more RFID transponders in the vicinity of the reader, wherein the one or more RFID transponders having an ID code stored during the learn mode are associated with respective animals, and wherein the learn mode is configured to read transponders from a first set of different transponder types, including transponders with different operating frequencies, for storing said at least one ID code and is further configured to derive and store in memory additional reader information corresponding to the at least one stored ID code from the one or more RFID transponders responsive to the interrogation, wherein said additional reader information includes at least an operating frequency of said one or more RFID transponders;
    wherein said learn mode, for each of the one or more RFID transponders, attempts to read a transponder by interrogating the transponder at multiple different frequencies, receives from the transponder in the vicinity of the reader an ID code of the transponder, and stores an associated ID code in memory of said RFID reader; and
    wherein said normal mode determines a read behavior of said RFID reader at least in part based on the additional reader information corresponding to the ID codes stored in memory and then interrogates an RFID transponder in the vicinity of said RFID reader to receive a signal from the interrogated RFID transponder associated with an animal, reads an ID code of the interrogated RFID transponder, and compares at least one ID code stored in memory of said RFID reader to the signal returned from the interrogated RFID transponder, wherein said interrogation is performed using said determined read behavior of said RFID reader, and wherein said determined behavior of said RFID reader comprises interrogating the RFID transponder in the vicinity of the RFID reader with a set of frequencies taken from a reduced set including only the frequencies associated with transponders having ID codes stored in said memory, wherein said determined read behavior of said RFID reader reduces an average power required to reliably read RFID transponders having said ID codes stored in said memory as compared to an average power required to reliably read all types of RFID transponders that may be stored by the learn mode; and wherein the pet door or pet feeder includes a pet sensor and wherein, in response to user selection of a learn mode, the pet door or pet feeder implements said learn cycle when the presence of a pet is registered by said pet sensor.

18. The pet door or pet feeder as claimed in claim 17 wherein said RFID reader is able to determine whether said transponder incorporates a temperature sensor, and to read said temperature sensor when present.

* * * * *